No. 618,702. Patented Jan. 31, 1899.
J. H. MASON.
DIRECT ACTING RECIPROCATING ELECTRIC MOTOR.
(Application filed Mar. 24, 1897.)
(No Model.)
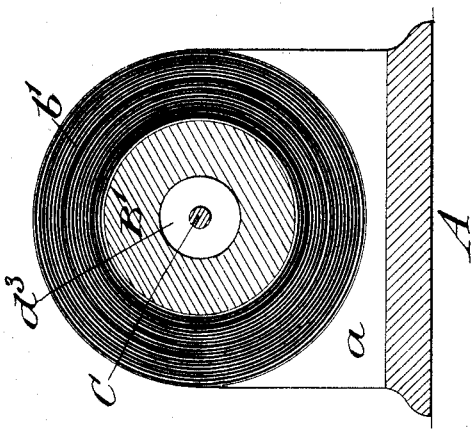
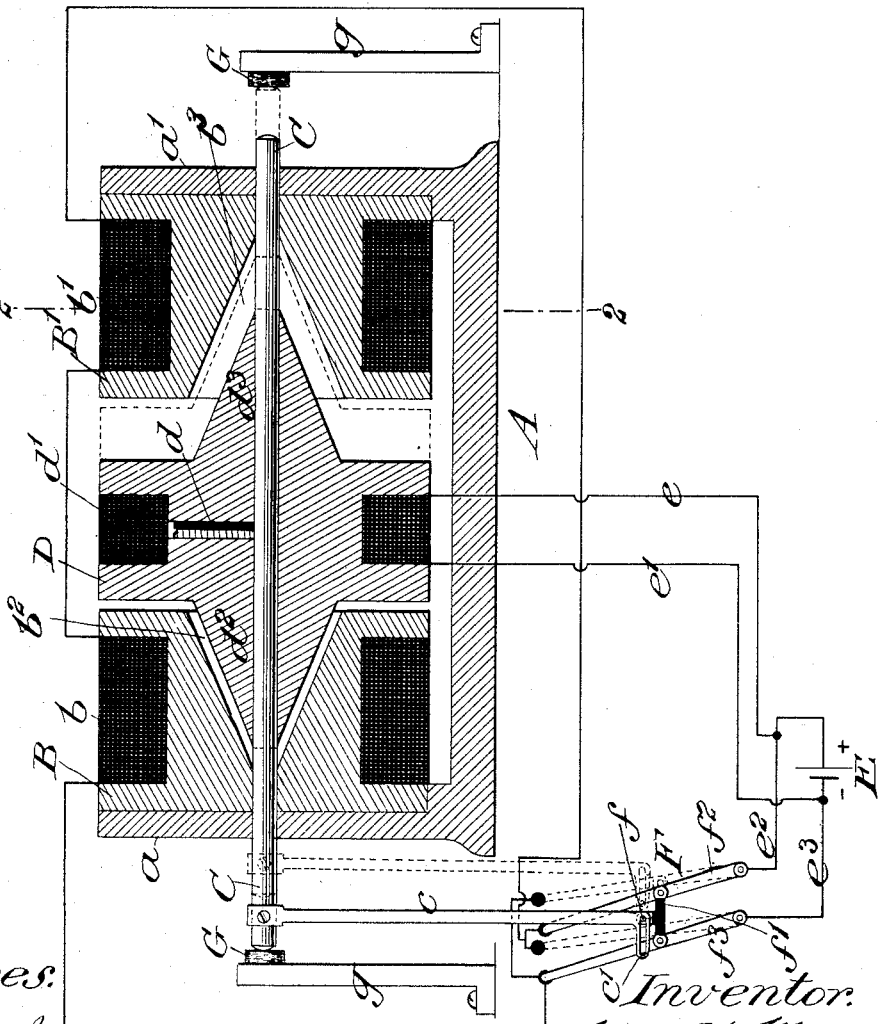
Witnesses.
George Barry Jr.
Fred Haynes
Inventor.
James H. Mason
by attorneys

UNITED STATES PATENT OFFICE.

JAMES H. MASON, OF NEW YORK, N. Y.

DIRECT-ACTING RECIPROCATING ELECTRIC MOTOR.

SPECIFICATION forming part of Letters Patent No. 618,702, dated January 31, 1899.

Application filed March 24, 1897. Serial No. 629,028. (No model.)

*To all whom it may concern:*

Be it known that I, JAMES H. MASON, of New York, (Brooklyn,) in the county of Kings and State of New York, have invented a new and useful Improvement in Direct-Acting Reciprocating Electric Motors, of which the following is a specification.

My invention relates to an improvement in electric motors, the object being to provide a direct-acting reciprocating electric motor in which a reciprocating movement may be directly applied to any desired mechanism without the use of intermediate direction-changing devices.
A further object is to provide a motor of the above character which will be very simple in construction, cheap to make and to use, and one in which the liability to get out of order is reduced to a minimum.
A further object is to provide a motor of the above character which shall be thoroughly automatic in operation, the change of the current which tends to reciprocate the armature being controlled by the movement of the said armature.

A practical embodiment of my invention is represented in the accompanying drawings, in which—

Figure 1 represents a vertical central section through the motor, a pole-changer and a pole-changing device being represented diametrically; and Fig. 2 is a vertical cross-section in the plane of the line 2 2 of Fig. 1.

A represents the base of a suitable iron frame, $a\ a'$ representing end uprights extending upwardly from the said base. A pair of field-magnets B B' are secured the one to the end upright $a$ and the other to the end upright $a'$ in any suitable manner, the faces of the said field-magnets being spaced a distance apart for permitting a limited reciprocating movement of an armature between the said field-magnets. The said field-magnets are provided with suitable coils $b\ b'$. An armature-shaft C is mounted to reciprocate longitudinally in the end uprights $a\ a'$, the said shaft passing through the cores of the field-magnets B B'.

The armature is denoted by D, and it is mounted to reciprocate with the shaft C. In the present instance it is shown as secured to the said shaft by means of a set-screw $d$, passing through its core and binding against the said shaft. The armature D is provided with a suitable coil $d'$.

E represents a suitable battery for maintaining a current of electricity through the coils in the field-magnets and also through the coils in the armature. In the present instance a constant current of electricity is caused to pass through the coil in the armature, the wires which connect the battery with the coil being denoted by $e\ e'$. This constant current will cause one face of the armature D to be at all times positive and its other face to be negative.

The wires which conduct the current of electricity to and from the coils in the field-magnets are denoted by $e^2\ e^3$. The direction of current is changed through the said field-magnet by means of a suitable pole-changer F, which is under the control of the reciprocating movement of the armature D.

The devices which I have shown in the accompanying drawings for automatically changing the direction of the current is an arm $c$, which is provided with an elongated slot $c'$ at its lower end, which slot engages a pin $f$ upon a suitable insulated cross-arm $f'$, which connects two rocking arms $f^2\ f^3$ of the pole-changer.

Because of the elongated slots $c'$ the field-magnets B B' are enabled to exert their full force, tending the one to repel the armature and the other to attract the armature, until the armature has nearly reached the limit of its movement in one direction, when the said pole-changer will be caused to shift and the polarity of the field-magnets thereby change.

To prevent pounding and unnecessary noise, the ends of the shaft C may be caused to strike against suitable cushions G, mounted on suitable stanchions or posts $g$ at opposite ends of the motor.

To increase the magnetic field area between the armature and the field-magnets B B', I have provided the said magnets with recesses $b^2\ b^3$, respectively, and have provided the armature D with oppositely-extended projections $d^2\ d^3$, which project, respectively, into the recesses $b^2\ b^3$. In the present instance the said recesses and projections are shown as conical. However, the armature and the field-magnets, as well as their sockets and projections, may be made of any desired form.

It is to be understood that instead of changing the direction of the current through the field-magnets to automatically change their polarity the reciprocating movement of the armature may be utilized to change the direction of the current through the armature for causing its movement, the current through the field-magnets being caused to be constant, if so desired.

What I claim is—

A direct-acting reciprocating electric motor comprising a pair of field-magnets spaced apart, an armature arranged to reciprocate between them, the one being provided with centrally-arranged conical recesses and the other with centrally-arranged conical projections located at all times partially or wholly within the recesses, the said pair of magnets and the armature being provided with adjacent vertical annular faces surrounding the projections and recesses, whereby the magnetic field is enlarged, means for maintaining a constant electric current in one direction through the armature, means for energizing the field-magnets and means under the control of the movement of the armature for changing the direction of the current through the field-magnet coils, substantially as set forth.

JAMES H. MASON.

Witnesses:
  FREDK. HAYNES,
  C. S. SUNDGREN.